(12) United States Patent
Miyahara

(10) Patent No.: US 7,192,013 B2
(45) Date of Patent: Mar. 20, 2007

(54) LIQUID SEALED MOUNT DEVICE

(75) Inventor: Tetsuya Miyahara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/819,121

(22) Filed: Apr. 7, 2004

(65) Prior Publication Data

US 2004/0201152 A1  Oct. 14, 2004

(30) Foreign Application Priority Data

Apr. 8, 2003  (JP)  ............ P.2003-104532

(51) Int. Cl.
*F16F 9/00* (2006.01)
(52) U.S. Cl. ............ 267/140.12; 267/219; 267/141.2
(58) Field of Classification Search ............ 267/141.1, 267/140.12, 141.2, 219
See application file for complete search history.

(56) References Cited

U.S. PATENT DOCUMENTS

| | | | | |
|---|---|---|---|---|
| 1,947,906 A | * | 2/1934 | Fine ............ | 29/512 |
| 4,690,389 A | * | 9/1987 | West ............ | 267/140.12 |
| 4,985,979 A | * | 1/1991 | Speakman ............ | 29/512 |
| 5,076,550 A | * | 12/1991 | Mayama et al. ....... | 267/140.12 |
| 5,120,175 A | * | 6/1992 | Arbegast et al. ............ | 411/501 |
| 5,221,077 A | * | 6/1993 | Noguchi ............ | 267/140.12 |
| 5,890,704 A | * | 4/1999 | Tsutsumida ............ | 267/140.12 |
| 6,450,486 B1 | * | 9/2002 | Satori et al. ............ | 267/140.12 |
| 6,637,995 B1 | * | 10/2003 | White ............ | 411/501 |

FOREIGN PATENT DOCUMENTS

| | | |
|---|---|---|
| EP | 0 896 168 A1 | 2/1999 |
| JP | 61-189339 | 8/1986 |
| JP | 03048035 A * | 3/1991 |
| JP | 07-158687 | 6/1995 |
| JP | 08135719 | 5/1996 |
| JP | 08-152043 | 6/1996 |
| JP | 08152043 | 6/1996 |
| JP | 09-079310 | 3/1997 |

* cited by examiner

*Primary Examiner*—Thomas Williams
(74) *Attorney, Agent, or Firm*—Arent Fox PLLC

(57) ABSTRACT

A main liquid chamber and a secondary liquid chamber are formed on both sides of an engine side mounting member to interpose the engine side mounting member. A rubber is vulcanized and molded integrally with the engine side mounting member. A car body side mounting member is injection molded of resin material in a state where the rubber, a pipe for molding a communication hole and the caulk fittings for caulking and fixing a lid member for closing an opening portion leading to one of the main liquid chamber and the secondary liquid chamber and provided in the car body side mounting member are disposed within an injection mold.

13 Claims, 6 Drawing Sheets

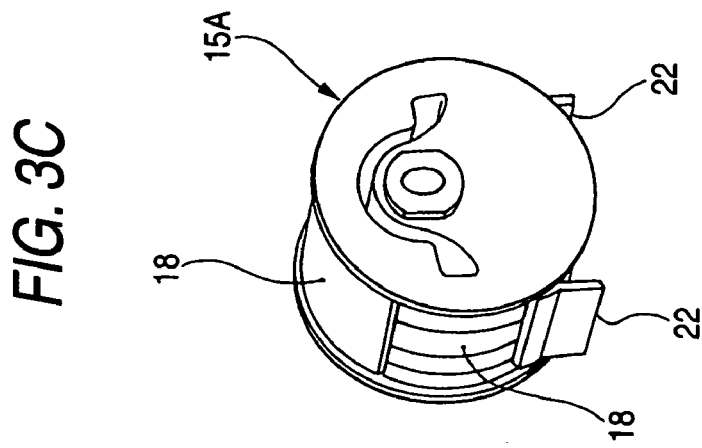
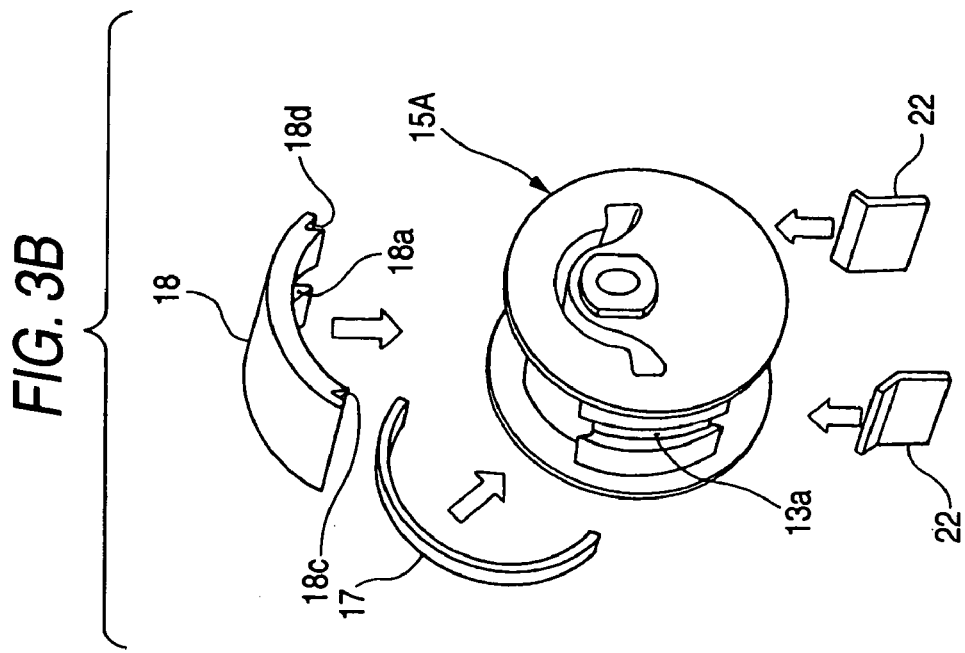
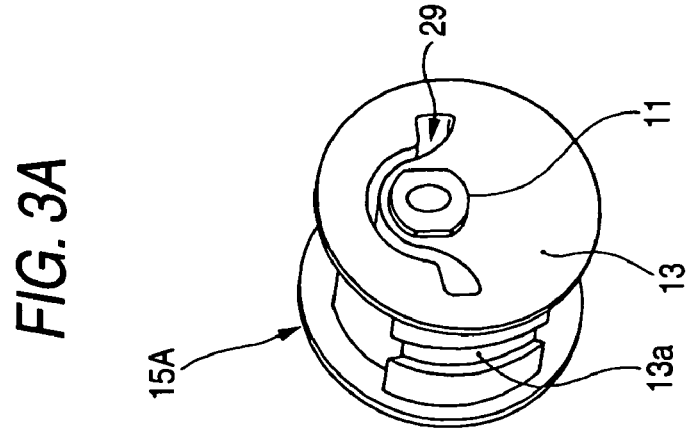

LIQUID SEALED MOUNT DEVICE

BACKGROUND OF THE INVENTION

The present invention relates to a liquid sealed mount device.

The liquid sealed mount device is well known in which a damping rubber is attached between an inner cylinder and an outer cylinder, one of the inner cylinder and the outer cylinder being a mounting portion on the car body side, and the other being a mounting portion on the engine side (e.g., refer to patent document 1).

[Patent Document 1]

JP-A-8-152043 (pages 2 and 3, FIG. 1)

Referring to FIG. 7, FIG. 1 of patent document 1 will be described below. Reference numerals are newly attached.

FIG. 7 is a cross-sectional view showing the conventional liquid sealed mount device. A liquid contained damping device 100 as the liquid sealed mount device includes an inner cylinder 101 attached on one of the car body side and the engine side, an elastic body 102 that is vulcanized and bonded to the inner cylinder 101, a resin bracket 103 joined on the outside of the elastic body 102, a partition member 105 for partitioning a liquid chamber 104 within the elastic body 102 into two chambers, a diaphragm 106, disposed outside the partition member 105, for forming one chamber together with the partition member 105, and a lid portion 108 for closing an opening portion 107 provided in the bracket 103 outside the diaphragm 106, and fixing the partition member 105 and the diaphragm 106.

In the above technique, since two liquid chambers partitioned by the partition member 105 are disposed on the side of the opening portion 107, the bracket 103 extends in one direction from the inner cylinder 101, which makes it difficult to produce the compact device.

Thus, if two liquid chambers are provided in the elastic body to interpose the inner cylinder, the damping device is constructed in the almost columnar shape, making it possible to produce the compact or smaller device. However, since two liquid chambers are separated, it is required to provide a long communication passage for communicating these liquid chambers For example, a groove communicating to two liquid chambers is formed on the outer circumferential face of the elastic body, and the bracket of a metallic barrel member is employed. Then, if the elastic body is press fit into this bracket, the communication passage for communicating two liquid chambers is formed. However, when the resin bracket is employed to reduce the weight of the metallic bracket, the resin bracket can not withstand a press fit load, whereby the above method for forming the communication passage cannot be employed. There is a desire for a structure for easily forming the communication passage.

SUMMARY OF THE INVENTION

It is an object of the invention to provide an improved liquid sealed mount device with lighter weight in which the communication passage for communicating two liquid chambers is easily formed.

In order to accomplish the above object, the present invention provides a liquid sealed mount device including a first mounting member, a second mounting member disposed to surround the first mounting member, a rubber for forming two liquid chambers for sealing the liquid and provided between the first mounting member and the second mounting member, and an orifice for communicating the two liquid chambers, characterized in that the two liquid chambers are formed on both sides of the first mounting member to interpose the first mounting member, the rubber is vulcanized and molded integrally with the first mounting member, and the second mounting member is injection molded of resin material in a state where the rubber, a shell for molding the orifice and the caulk fittings for caulking and fixing a lid member for closing an opening portion leading to one of the two liquid chambers and provided in the second mounting member are disposed within a mold.

Since two liquid chambers are formed on both sides of the first mounting member, the liquid sealed mount device is made smaller and lighter.

Moreover, when the second mounting member is injection molded, the shell is embedded into the second mounting member, whereby the orifice is easily and securely formed.

BRIEF DESCRIPTION OF THE DRAWINGS

FIGS. 3A to 3C are a first action view showing a way for manufacturing the liquid sealed mount device according to the invention.

DETAILED DESCRIPTION OF THE PREFERRED EMBODIMENTS

Figure 1:
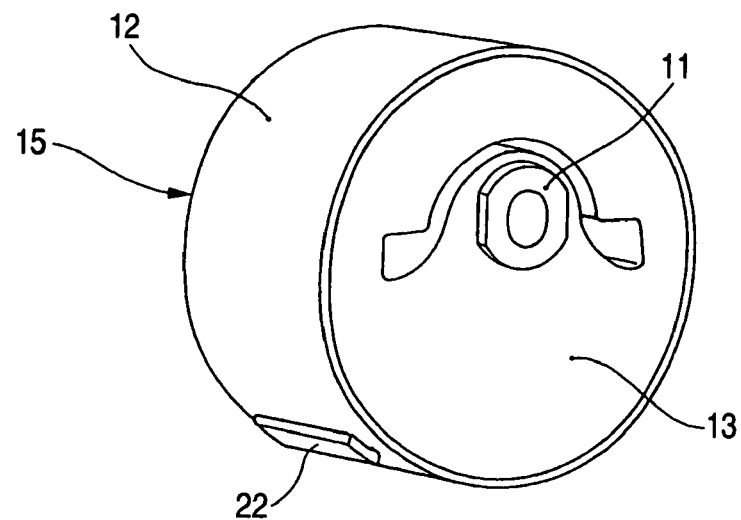
FIG. 1 is a perspective view showing a liquid sealed mount device according to the present invention.

The preferred embodiments of the present invention will be described below with reference to the accompanying drawings. Throughout the figures, the same or like parts are designated by the same reference numerals.

FIG. 1 is a perspective view showing a liquid sealed mount device according to the invention. In the liquid sealed mount device 15, a car body side mounting member 12 mounted on the car body side is disposed around an engine side mounting member 11 mounted on the engine side, in which the engine side mounting member 11 and the car body side mounting member 12 are connected by a rubber for damping 13, with a sealing liquid provided inside.

Figure 2:
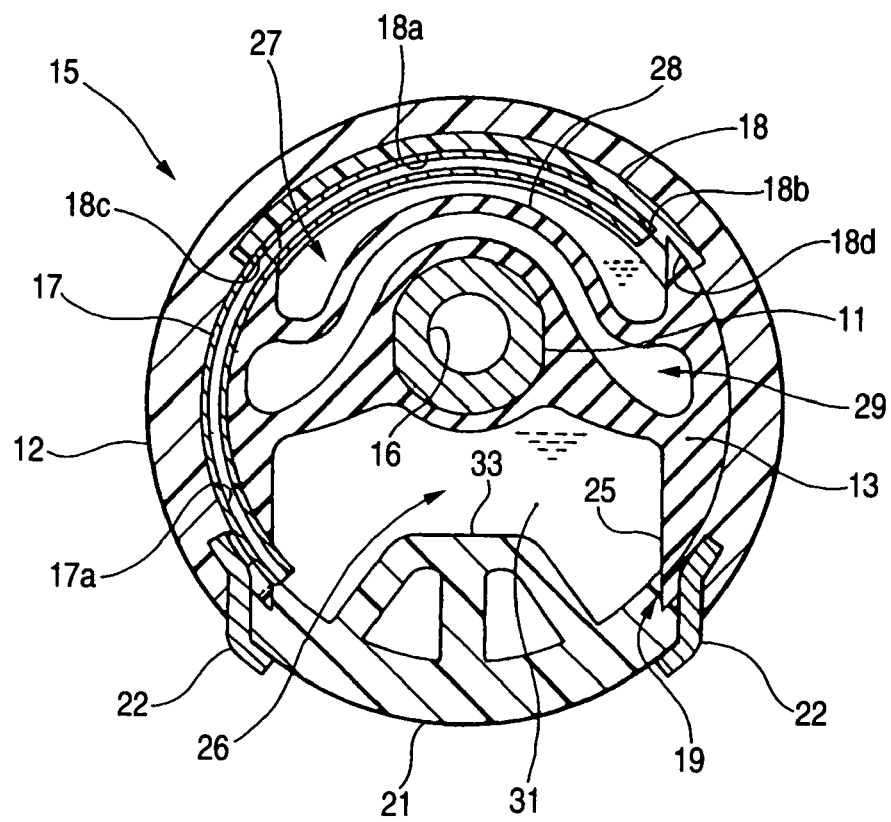
FIG. 2 is a cross-sectional view of the liquid sealed mount device according to the invention, taken along a direction perpendicular to the axis.

FIG. 2 is a cross-sectional view of the liquid sealed mount device according to the invention, taken along a direction perpendicular to the axis. The liquid sealed mount device 15 includes the engine side mounting member 11 as the first mounting member that is cylindrical and metallic with a mounting hole 16 opened, the rubber 13 vulcanized and molded around the engine side mounting member 11, a pipe 17 as a shell disposed outside the rubber 13, the pipe 17 being circular and made of metal such as iron or aluminum or resin such as nylon, a pressing plate 18 made of resin and having an almost circular cross section, which is disposed outside the pipe 17, the car body side mounting member 12 as the second mounting member made of resin, which is injection molded into the rubber 13, the pipe 17 and the pressing plate 18, a lid member 21 made of resin for closing an opening portion 19 on the car body side mounting member 12, and the caulk fittings 22, 22 for caulking and fixing the lid member 21, each caulk fitting being partly embedded into the edge part of the opening portion on the car body side mounting member 12.

The rubber 13 includes a main liquid chamber 26 formed by closing the opening portion 25 with the lid member 21, a secondary liquid chamber 27 provided on the opposite side of the engine side mounting member 11 to the main liquid chamber 26, a diaphragm 28 for forming a wall of the secondary liquid chamber 27, and a gap 29 provided between the main liquid chamber 26 and the secondary liquid chamber 27. Liquid 31 is filled within the main liquid chamber 26 and the secondary liquid chamber 27, which are communicated through the pipe 17 as the shell. Reference numeral 17a denotes a communication hole as the orifice within the pipe 17.

The pressing plate 18 is a member including a positioning groove 18a, formed circumferentially, for positioning the pipe 17 at a predetermined position by pressing the pipe 17 within an injection mold when the car body side mounting member 12 is injection molded, a step portion 18b being contacted by an end portion of the pipe 17 to regulate the movement of the pipe 17 within the positioning groove 18a, and the V-character grooves 18c and 18d provided at both end portions for engagement with the rubber 13. By closing the outer circumferential side of the secondary liquid chamber 27, the pressing plate 18 prevents molten resin from flowing around the secondary liquid chamber 27 in injection molding the car body side mounting member 12 of resin.

The lid member 21 is a part having a stopper portion 33 disposed on the side of the main liquid chamber 26 to regulate an excessive movement of the engine side mounting member 11, when the engine side mounting member 11 is moved downwards on the car body side mounting member 12.

The caulk fitting 22 is a member embedded when the car body side mounting member 12 is injection molded.

Referring to FIGS. 3 to 6, a way for manufacturing the liquid sealed mount device will be described below.

FIGS. 3A to 3C are first action views showing the way for manufacturing the liquid sealed mount device according to the invention.

FIG. 3A shows a first intermediate molding 15A in which the rubber 13 is vulcanized and molded on the engine side mounting member 11. Reference numeral 13a denotes a positioning groove formed circumferentially on the outer circumferential face of the rubber 13 to position the pipe 17 (see FIG. 2).

In FIG. 3B, the pipe 17 and the pressing plate 18 are positioned in the first intermediate molding 15A, and the first intermediate molding 15A and the caulk fittings 22, 22 are positioned at predetermined positions within the injection mold.

In FIG. 3C, the first intermediate molding 15A, the pipe 17, the pressing plate 18 and the caulk fittings 22, 22 are positioned within the injection mold.

Figure 4:
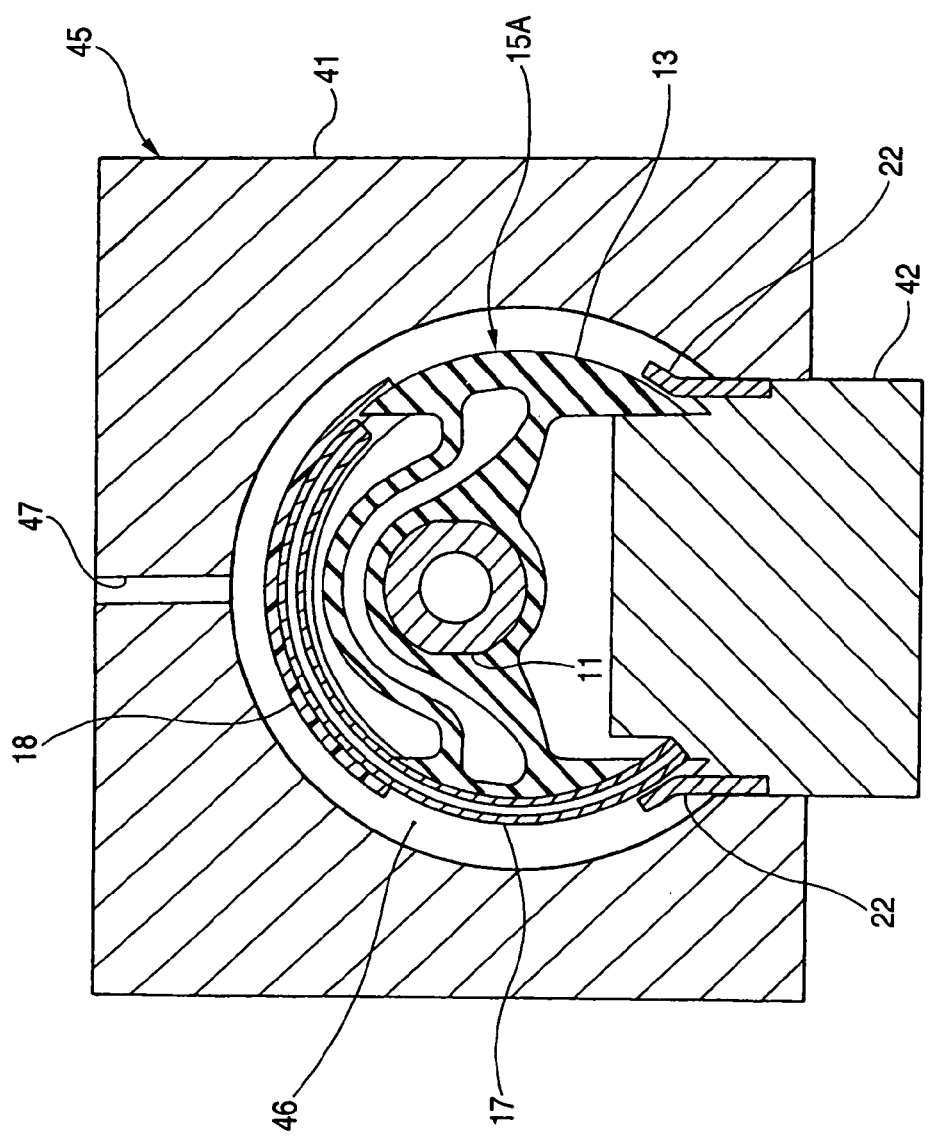
FIG. 4 is a second action view showing a way for manufacturing the liquid sealed mount device according to the invention.

FIG. 4 is a second action view showing a way for manufacturing the liquid sealed mount device according to the invention, in which the parts as shown in FIG. 3C are positioned within the injection mold.

That is, the first intermediate molding 15A, the pipe 17, the pressing plate 18 and the caulk fittings 22, 22 are positioned within an injection mold 45 including the split molds 41, 41 (one split mold 41 is only shown), split in the direction perpendicular to the paper face, and a middle mold 42. In FIG. 4, reference numeral 46 denotes a cavity for molding the car body side mounting member 12 (see FIG. 2) and 47 denotes an inlet opening for injecting the molten resin into the cavity 46.

Figure 5B:
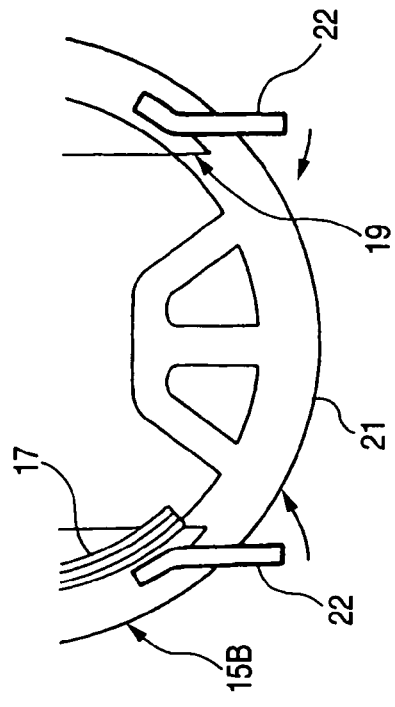
FIGS. 5A to 5C are a third action view showing a way for manufacturing the liquid sealed mount device according to the invention.
Figure 5C:
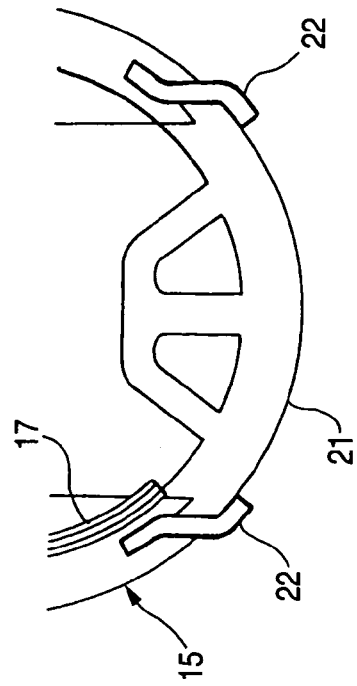
Figure 5A:
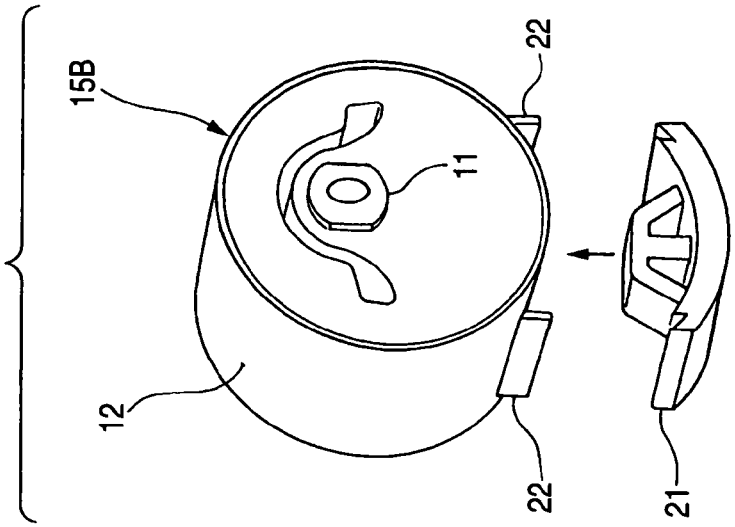

FIGS. 5A to 5C are third action views showing a way for manufacturing the liquid sealed mount device according to the invention.

In FIG. 5A, a second intermediate molding 15B made by injection molding the car body side mounting member 12 is soaked in the liquid, and the lid member 21 is fitted into an opening portion of the second intermediate molding 15B. Accordingly, the liquid is filled in the liquid chamber of the second intermediate molding 15B.

FIG. 5B shows a state where the lid member 21 is fitted into the opening portion 19 of the second intermediate molding 15B. At this time, the caulk fittings 22, 22 extend straightly downwards. From this state, the caulk fittings 22, 22 are bent as indicated by the arrow.

FIG. 5C shows a state where the caulk fittings 22, 22 are bent and the lid member 21 is caulked. Thereby, the liquid sealed mount device 15 is completed.

Figure 6:
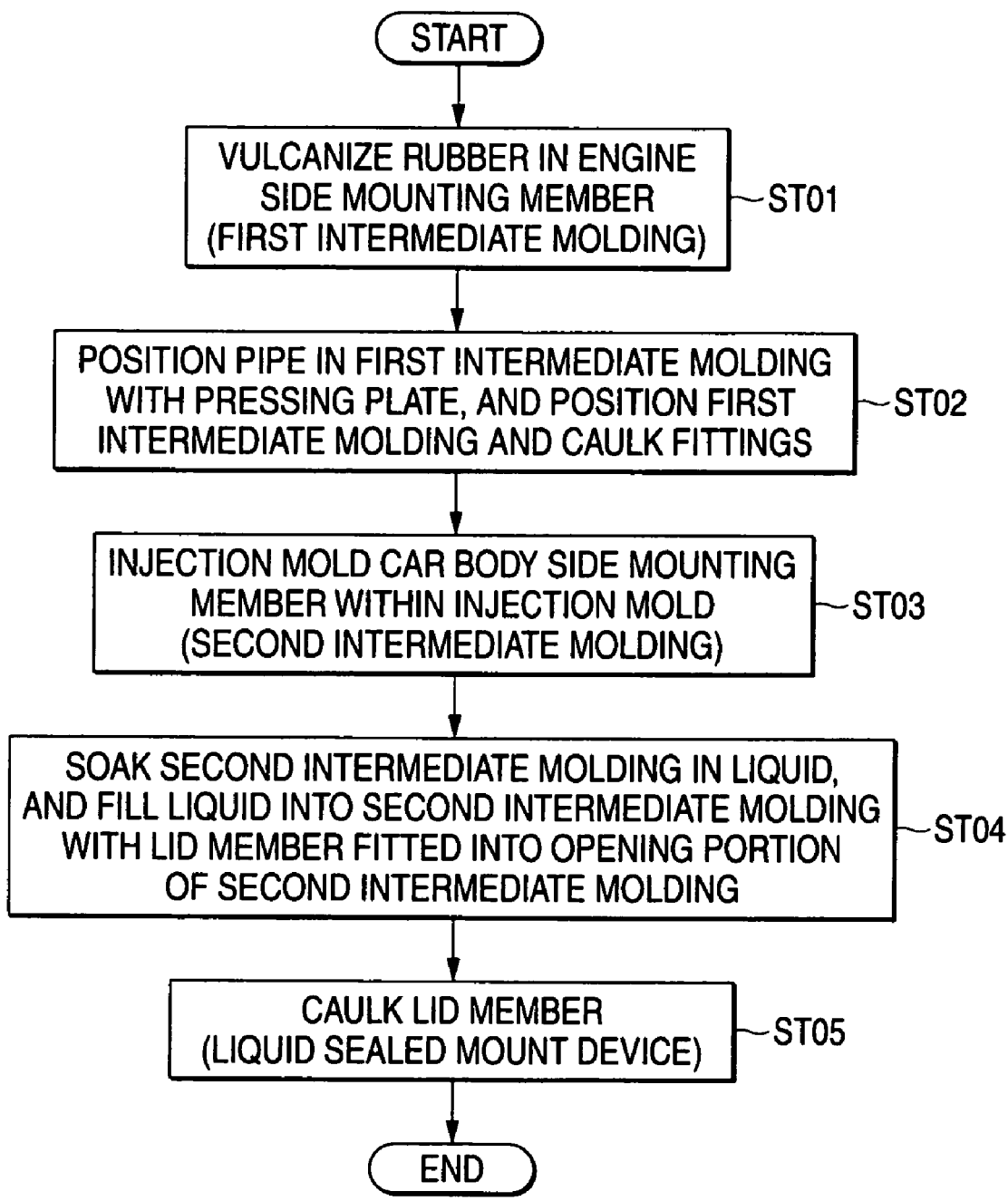
FIG. 6 is a flowchart showing a way for manufacturing the liquid sealed mount device according to the invention.
Figure 7:
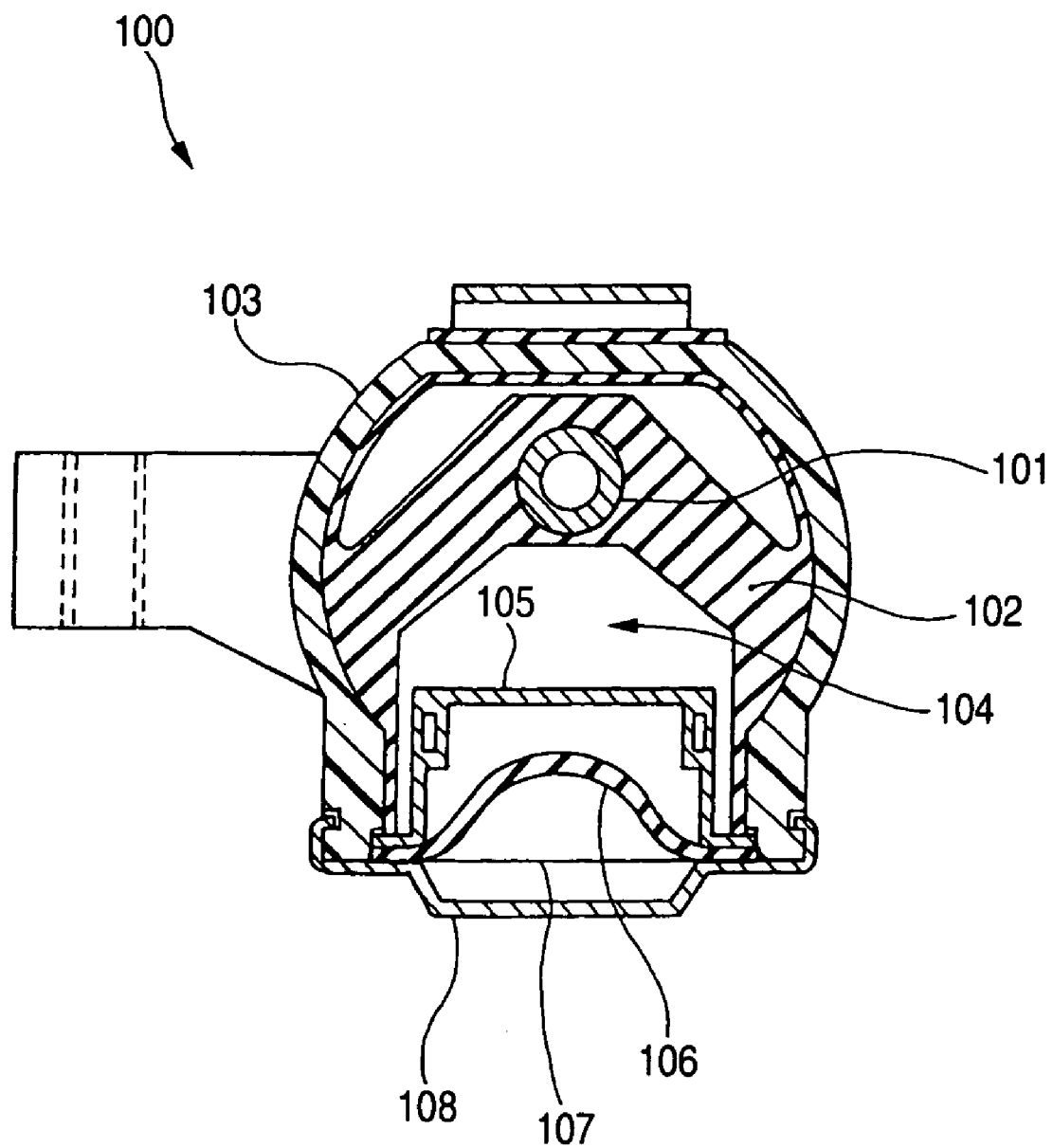
FIG. 7 is a cross-sectional view showing the conventional liquid sealed mount device.

FIG. 6 is a flowchart showing a way for manufacturing the liquid sealed mount device according to the invention. STxx denotes the step number.

ST01 . . . Vulcanize and mold the rubber in the engine side mounting member (thereby producing the first intermediate molding).

ST02 . . . Position the pipe in the first intermediate molding with the pressing plate, and further position the first intermediate molding and the caulk fittings within the injection mold.

ST03 . . . Injection mold the car body side mounting member within the injection mold (thereby producing the second intermediate molding).

ST04 . . . Soak the second intermediate molding in the liquid, and fill the liquid into the second intermediate molding with the lid member fitted into the opening portion of the second intermediate molding.

ST05 . . . Caulk the lid member (thereby producing the liquid sealed mount device).

As described above using FIG. 2, with the invention, the main liquid chamber 26 and the secondary liquid chamber 27 are formed on both sides of the engine side mounting member 11, the liquid sealed mount device 10 is made in the columnar shape, for example, in which the engine side mounting member 11 is disposed roughly in the center, whereby the liquid sealed mount device 10 is compact, and has a smaller size and a lighter weight.

Moreover, when the car body side mounting member 12 is injection molded, the pipe is embedded into the car body side mounting member 12, whereby the communication hole 17a as the orifice is formed easily and securely.

In this embodiment, the pipe 17 and the pressing plate 18 are separate members, but may be molded integrally of the same material, as far as the pipe is enough rigidity not to be deformed by injection molding the car body side mounting member 12 of resin and the material is not affected by heat in injection molding. If the pipe 17 and the pressing plate 18 are molded integrally n this way, an integral product of the pipe and the pressing plate may be easily positioned within the injection mold.

The above constitution of the invention has the following effects.

In the liquid sealed mount device of the invention, two liquid chambers are formed on both sides of the first mounting member to interpose the first mounting member, the rubber is vulcanized and molded integrally with the first mounting member, and the second mounting member is injection molded of resin material in a state where the rubber, a shell for molding the orifice and the caulk fittings for caulking and fixing a lid member for closing an opening portion leading to one of the two liquid chambers and provided in the second mounting member are disposed within a mold. Thereby, since two liquid chambers are formed on both sides of the first mounting member, the liquid sealed mount device is made compact, smaller, and lighter.

Moreover, when the second mounting member is injection molded, the shell is embedded into the second mounting member, whereby the orifice is easily and securely formed.

What is claimed is:

1. A liquid sealed mount device comprising:
    a first mounting member;
    a second mounting member surrounding the first mounting member;
    a rubber disposed between the first and second mounting members and defining two liquid chambers which seal liquid therein;
    an opening portion defined in the second mounting member and leading to one of the two liquid chambers;
    a lid member made of resin which closes the opening portion;
    metal caulk fittings which caulk and fix the lid member to the second mounting member, a portion of each of said metal caulk fittings being embedded in the second mounting member and the remainder of each metal caulk fitting being exposed;
    a shell disposed between the rubber and second mounting member;
    a pressing plate for pressing the shell; and
    an orifice in communication with the two liquid chambers; wherein
        the two liquid chambers are formed on both sides of the first mounting member to interpose the first mounting member;
        the rubber is vulcanized and molded integrally with the first mounting member;
        the second mounting member is injection molded of resin material in a state where the rubber, the shell, and the caulk fittings are disposed within a mold;
    wherein the pressing plate further includes a step portion and a pair of v-shaped grooves at opposite ends thereof,
    wherein the step portion contacts an end portion of the shell and regulates movement of the shell, and
    wherein the v-shaped grooves engage the rubber.

2. The liquid sealed mount device according to claim 1, wherein the first mounting member includes a mounting aperture defined therein.

3. The liquid sealed mount device according to claim 1, wherein the shell and the pressing plate are molded integrally of the same material.

4. The liquid sealed mount device according to claim 1, wherein each caulk fitting is partially embedded within an edge part of the opening portion.

5. The liquid sealed mount device according to claim 1, wherein the rubber further comprises a diaphragm which defines a wall of the other one of the two liquid chambers.

6. The liquid sealed mount device according to claim 1, further comprising a gap formed between the two liquid chambers.

7. The liquid sealed mount device according to claim 1, wherein the orifice is formed in the shell.

8. The liquid sealed mount device according to claim 1, wherein the rubber further comprises a positioning groove within which the shell is positioned at a predetermined position.

9. The liquid sealed mount device according to claim 8, wherein the positioning groove is formed circumferentially on an outer circumferential face of the rubber.

10. The liquid sealed mount device according to claim 1, wherein the lid member comprises a stopper portion disposed on a side facing the one of the two liquid chambers.

11. The liquid sealed mount device according to claim 1, wherein the pressing plate includes a positioning groove within which the shell is positioned at a predetermined position.

12. The liquid sealed mount device according to claim 1, wherein the pressing plate is disposed between the shell and the second mounting member.

13. A liquid sealed mount device comprising:
    a first mounting member;
    a second mounting member surrounding the first mounting member;
    a rubber disposed between the first and second mounting members and defining two liquid chambers which seal liquid therein;
    an opening portion defined in the second mounting member and leading to one of the two liquid chambers;
    a lid member made of resin which closes the opening portion;
    two plate-shaped metal caulk fittings which caulk and fix the lid member to the second mounting member, a portion of each of the metal caulk fittings being embedded only in the second mounting member to interpose a center portion of the lid member at the opening portion and the remainder of each metal caulk fitting being exposed;
    an orifice in communication with the two liquid chambers,
    wherein the two liquid chambers are formed on both sides of the first mounting member to interpose the first mounting member,
    the rubber is vulcanized and molded integrally with the first mounting member,
    the second mounting member is injection molded of resin material in a state where the rubber and the caulk fittings are disposed within a mold, and
    the exposed portion of each of the metal caulk fittings is bent to fix the lid member.

* * * * *